Figure 1:
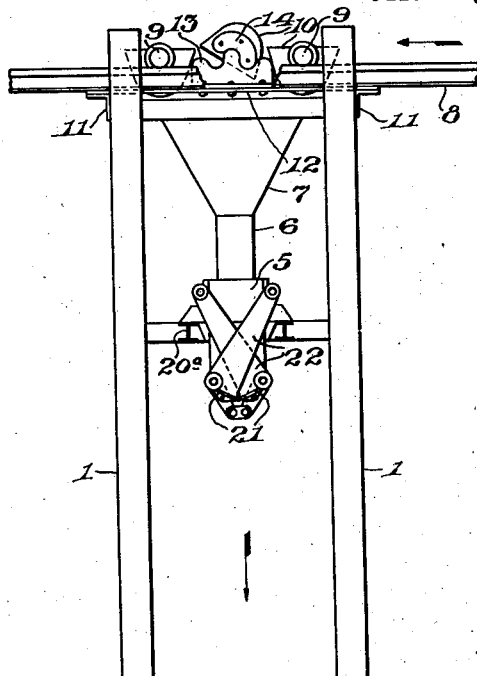

July 4, 1944.  E. G. COWAN ET AL  2,352,771
DROP-MUD METHOD OF AND APPARATUS FOR MOLDING BRICKS
Filed May 25, 1943  3 Sheets-Sheet 1

INVENTORS
Elmer G. Cowan
John M. Coder,
by J. Stuart Freeman
ATTORNEY

July 4, 1944. E. G. COWAN ET AL 2,352,771
DROP-MUD METHOD OF AND APPARATUS FOR MOLDING BRICKS
Filed May 25, 1943 3 Sheets-Sheet 2

INVENTORS
Elmer G. Cowan
John M. Coder,
by J. Stuart Freeman
ATTORNEY

July 4, 1944.  E. G. COWAN ET AL  2,352,771
DROP-MUD METHOD OF AND APPARATUS FOR MOLDING BRICKS
Filed May 25, 1943  3 Sheets-Sheet 3

INVENTORS
Elmer G. Cowan
John M. Coder,
by J. Stuart Freeman
ATTORNEY

Patented July 4, 1944

2,352,771

UNITED STATES PATENT OFFICE 2,352,771

DROP-MUD METHOD OF AND APPARATUS FOR MOLDING BRICK

Elmer G. Cowan and John M. Coder, Claysburg, Pa., assignors to General Refractories Company, Philadelphia, Pa., a corporation of Pennsylvania Application May 25, 1943, Serial No. 488,470

23 Claims. (Cl. 25—103)

The object of the invention broadly is to provide improvements in the drop-mud method of molding and in the machinery for practising such method, but more specifically in that type which is characterized by a substantial sized body of so-called "mud"—usually composed of comminuted clay, ganister, or similar materials, water and a small amount of binder—falling by gravity towards and into a given mold.

In this method of molding, the body of mud comprises a mass considerably larger than, and preferably several times, the capacity of the mold, so that the inertia of said body at the moment of impact in and with the bottom of the mold, or with a supporting surface beneath it, will be so magnified by the acceleration of gravity, that the mud will be forced into the smallest offsets or recesses in the mold surfaces.

Accordingly, the mud body is preferably longer and wider than the single mold or gang of mold cells, while vertically it is of considerable height, in order to give it sufficient initial weight to start it from within an elevated hopper, as well as excess volume over that of the mold's capacity. As an example, a representative mud body destined for an end-to-end pair of 12″ x 6″ x 2½″ mold cells may be as large as 24″ high by 27″ long by 5½″ wide at its lower end, tapering upwardly to a width of about 5″ or thereabouts, such taper permitting said body to leave the hopper unbroken and with a minimum retardation due to friction. The bottom of this mud mass, hereinafter referred to as a "wock," is also preferably rounded or bluntly tapered, in order to minimize air resistance.

However, this method has heretofore been limited in its use as the result of a tendency of the mud body to entrap air in the mold cells, and thereby prevent the mud from completely filling all of the offsets and recesses present. Efforts to prevent this drawback by increasing the height of the fall developed the fact that there is a practical limit to permissible elevation of the hopper above the mold. When placed too high, the relatively solid body tends to bounce back, probably due in part to its own resiliency added to the expanding force of the entrapped air when thus highly compressed.

A specific object of the invention, therefore, is to provide a method for completely eliminating all of the entrapped air within the respective mold cells, while in no way decreasing the initial weight and final velocity and resulting inertia of the mud body, this being accomplished by trimming said body transversely to a width substantially less than the internal width of the smallest mold cell, if cells of different widths are present, shortly before said body reaches the mold. As a result of this trimming, the lowermost portion of the body, especially if somewhat tapered, expells the air from each mold cell as it enters, and continues such expulsion as said body mushrooms against the lower wall, whether it be the inner wall of the mold or a supporting surface therefor.

Another object is to provide a machine for efficiently carrying out this method, such machine comprising the combination of an elevated hopper, having preferably a pair of symmetrical bottom closure elements, a mold firmly supported at a substantial distance below said hopper, and normally fixedly positioned knife blades, between which the central portion of the mud body or wock passes shortly prior to reaching said mold, said blades severing from said central portion the laterally oppositely directed portions of said body, so that the width (and, if desired, the horizontal length as well) of said body is substantially less than that of the mold cell or cells.

Still another object is to provide means for adjustably positioning said blades, each of which is preferably sharpened with a bevel or chamfer upon one side only, and the bevels of opposed blades being parallel and vertical (or slightly divergent downwardly), so as to offer minimum resistance to the intervening central portion of said wock. Also, by beveling and thereby sharpening opposite edges of each of said blades, they may be inverted when the upper edges become dull, thereby permitting reversal and a second set of sharp edges to be directed upwardly towards the subsequent falling wocks with minimum loss of time and material.

Figure 4:
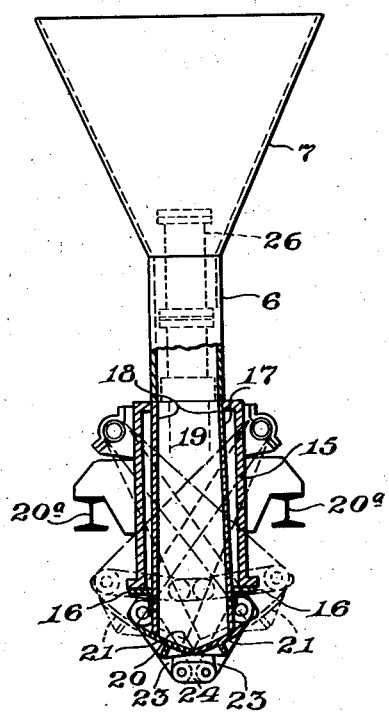
Figure 13:
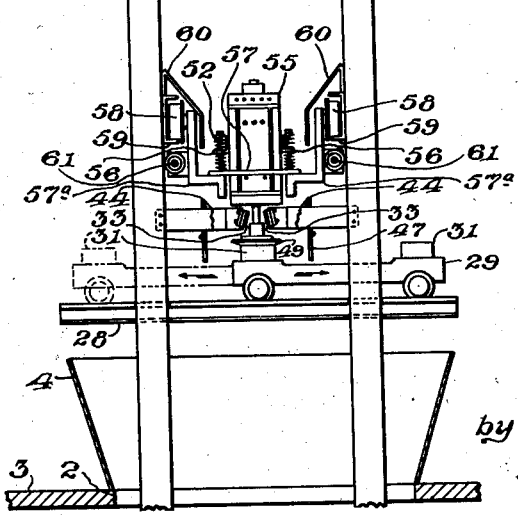
Figure 13:
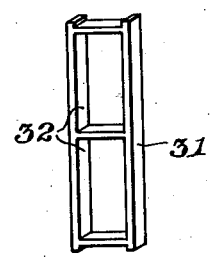
Figures 2, 3, 9, 10:
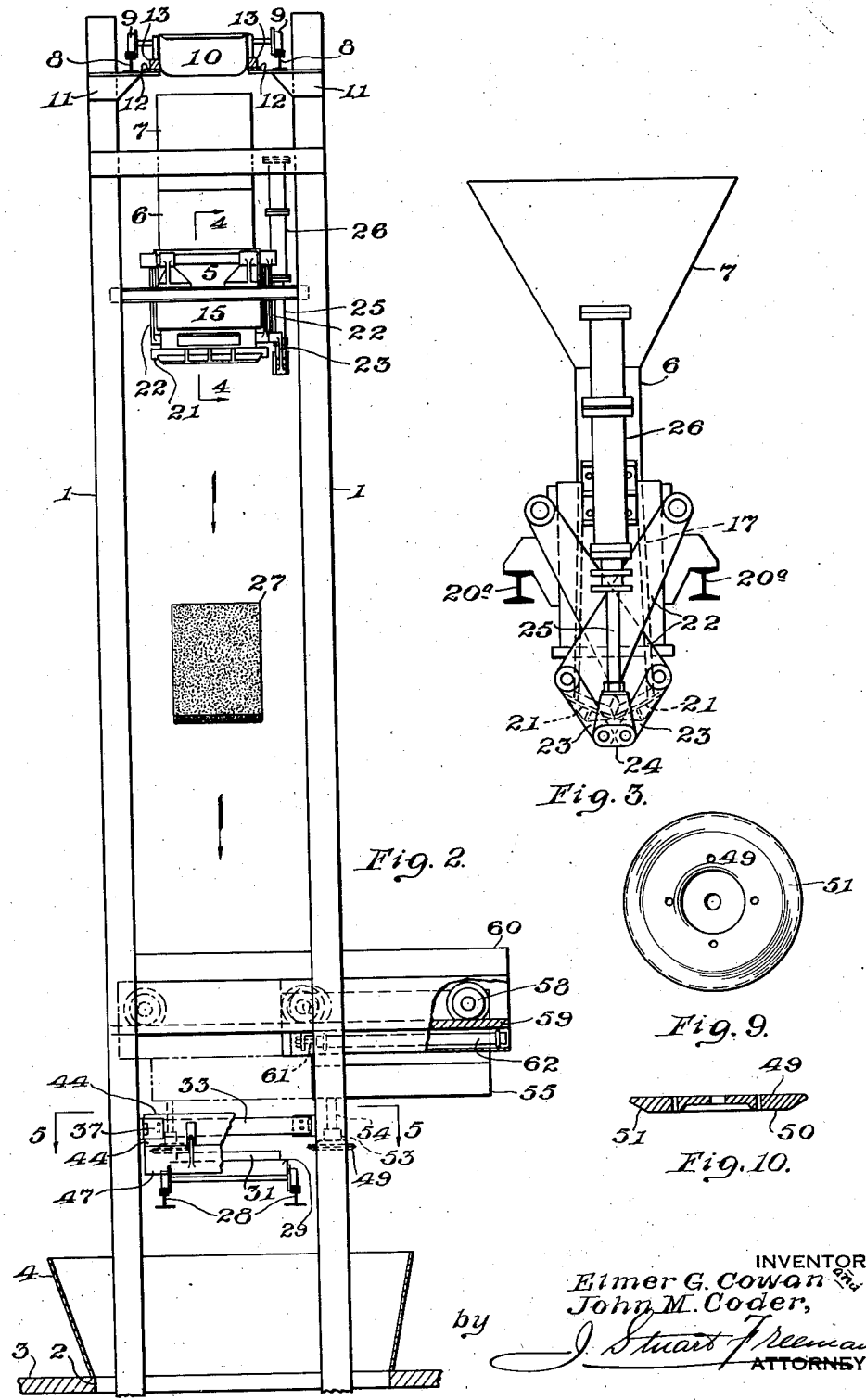
Figure 5:
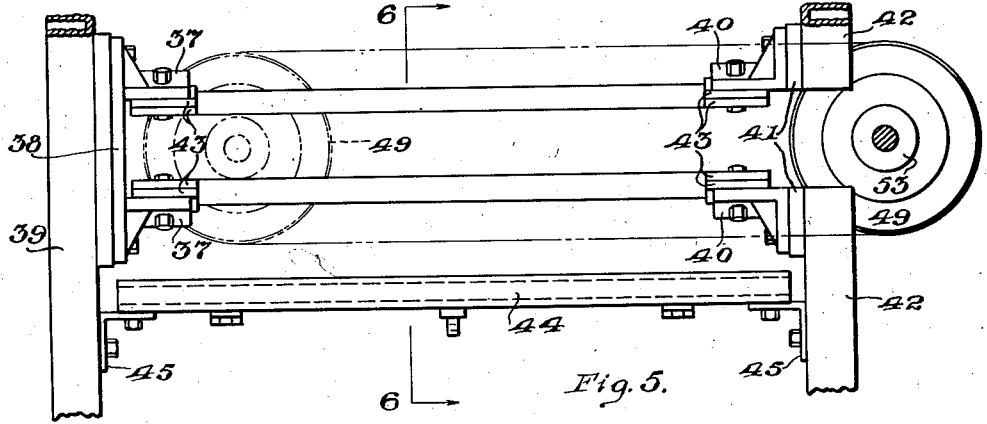
Figures 7, 8:
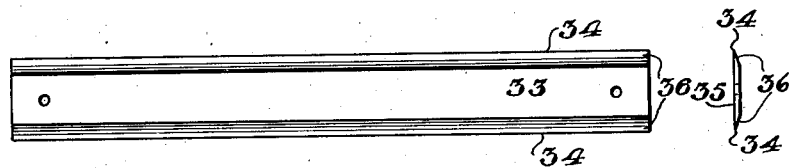
Figure 11:
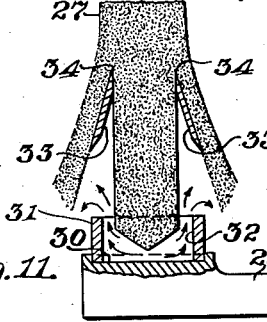
Figure 6:
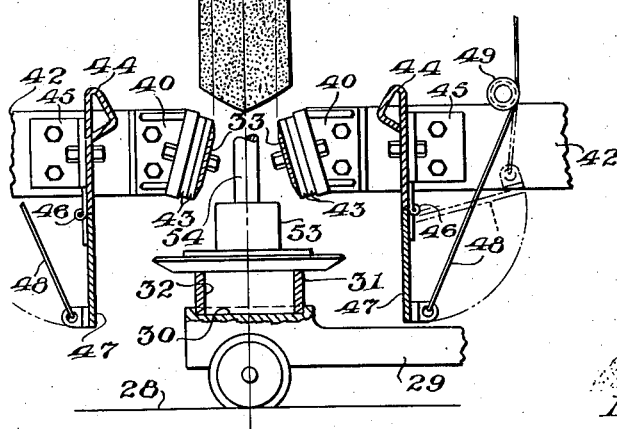
Figure 12:
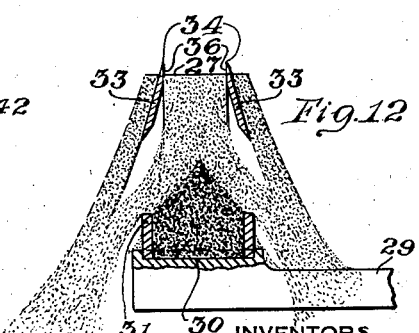

With the objects thus briefly stated, the invention comprises further details of construction and operation, which are hereinafter fully brought out in the following description, when read in conjunction with the accompanying drawings, in which Fig. 1 is a front elevation of a molding machine comprising one embodiment of the invention, the central portion of the forward blade-supporting channel bar being cut away to show the position of the trimming blades; Fig. 2 is a side elevation of the same, with a portion of the nearer splash guard cut away to show the position of the blades; Fig. 3 is an enlarged rear elevation of the hopper and its closure-operating mechanism; Fig. 4 is a front elevation of said hopper, the lower portion of which is broken away to show its cross section on the line 4—4 of Fig. 2; Fig. 5 is an enlarged plan view of the central portion of the machine taken on the line 5—5 of Fig. 2; Fig. 6 is a vertical section on the line 6—6 of Fig. 5; Fig. 7 is a plan and Fig. 8 an end elevation of one of the trimming blades; Fig. 9 is a plan and Fig. 10 a diametrical section of the rotatable slicker disc; Figs. 11 and 12 are sectional views showing in sequence relative positions of the falling mud body, the trimming blades and a mold, following the position of the corresponding elements shown in Fig. 6; and Fig. 13 is a perspective view of a representative type of mold.

Referring to the drawings, one embodiment of the invention is shown as comprising four parallel I-beam standards 1, resting upon a firm foundation (not shown) and extending upwardly therefrom through an opening 2 in a floor 3, two or more of the sides of said opening being provided with upwardly and outwardly slanting aprons 4, for a purpose hereinafter described.

Supported by and between the upper portions of said standards 1 is a hopper unit 5, into which leads a chute 6, surmounted by a rectangular funnel 7. Transversely across the upper open end of said funnel extend track rails 8, carrying the wheels 9 of an endless chain or series of buckets 10. Suitable brackets 11, carried by the respective standards, support horizontally extending plates 12, which carry any desired form of trip device, here represented by an irregular cam 13, with which cooperate members 14 carried by each bracket, for effecting an inversion of the buckets in sequence, as they pass above said funnel.

After each bucket in turn has dumped its contents into the funnel and thereby into said hopper, it is returned to its normal upright position, and continues on around a complete circuit (not shown in full), during which time said buckets pass beneath the floor opening 2 to receive surplus mud, as it falls from the molding operations, and at another point in their path to receive fresh mud from the grinding and mixing pans sufficient to fill them to a predetermined degree.

Referring to enlarged Figs. 3 and 4, the hopper unit 5 comprises an outer casing 15, provided at its lower end with brackets 16 for supporting the hopper 17. This hopper comprises upwardly converging side wall surfaces 18, connected by similarly converging end walls 19, said end walls preferably extending freely below said side walls to form downwardly projecting, bluntly tapering extensions 20. The hopper unit as a whole is supported by I-beams 20a connecting lateral pairs of the supporting standards 1.

The upper end of said hopper is open and communicates directly with the chute 6, while its lower end is normally closed by a pair of transversely reinforced closure plates 21, which connect free end portions of the arms 22, pivotally carried by the opposite upper walls of the casing 15. The lower end portions of said arms are provided with links 23, which are connected together by central links 24, forming heads which are in turn secured to the outer end of a piston 25, extending from within a pneumatic cylinder 26, which is secured to the outer surface of the hopper casing 15.

By this arrangement, when the air pressure above said piston is released and pressure applied beneath it, the links 24 rise and thereby spread apart the lower ends of the arms 22, thus withdrawing the closure plates 21 laterally upon the opposite sides of the hopper, and permitting the wock 27 to fall therefrom. Reverse application of the air pressure causes the piston to move downwardly, thereby again shifting the plates 21 into closed position for the temporary retention of mud thereafter received from one or more of the buckets continuously moving above the funnel 7.

Adjacent to the lower portions of and between the standards 1 are suitably supported rails 28, upon which reciprocates any desired form of carriage 29, having upper surfaces 30 carrying molds 31. These molds may be of any practical size and shape, with any convenient number of cells 32 (Fig. 13), the example illustrated having a pair of elongated cells abutting each other end-to-end. When one mold has been filled with the carriage in the position shown in Fig. 1, said carriage is shifted by pneumatic or other convenient means into the dot-and-dash position, so that the second mold is thereby brought into operative position for filling, while the first mold is being emptied and sanded for re-filling, whereupon the carriage is again shifted to its original position.

A short distance above the level of said molds is a pair of blades 33 (Figs. 1, 2, 5, 6, 7, and 8), having essentially an upwardly directed cutting edge 34, formed by the intersection of its outer flat surface 35 with a bevelled surface 36, such bevel and resulting edge being preferably duplicated downwardly, in order to make the blade reversible, or rather invertible, so as to present a fresh cutting edge when the upper one has become worn and dulled under constant abrasion by the succession of rapidly descending wocks.

At their forward ends, these blades are rigidly supported by and against the adjacent upwardly converging surfaces of a pair of spaced brackets 37, which comprise integral extensions of a plate 38, secured to a channel bar 39 that extends between and is supported by the forward pair of standards 1. The rear ends of said blades are similarly supported by spaced brackets 40, integrally carried by separate plates 41, which are in turn supported by the adjacent ends of channels 42, between which is a gap to permit the entrance of the shaft of a rotating slick between said blades.

The slant of the supporting brackets 37 and 40 is such that the adjacent, upper, bevelled surfaces of said blades are in parallel planes, in order to permit the free passage of the central portion of the wock between them, as the laterally opposite sides thereof are removed by said blades, while the distance between the operatively positioned upper cutting edges of said blades is adjusted in any suitable manner, as by the use of shims 43.

The purpose of the blades and their adjustment is clearly indicated by Fig. 11. There it is shown that by trimming the central portion of the wock to a width substantially less than that of the mold interior, and especially if the lower surface of the wock is somewhat tapered, the air in the mold is ejected by the wock as it enters and, upon abruptly impinging against the bottom surface or bed of the mold mushrooms laterally, and thence builds upwardly until the mold cells are filled, and the surplus overflow, splashing principally towards the laterally opposite sides, is caught by the guards 4 and led towards the lower course of the moving buckets.

For the purpose of minimizing the dispersion of the splash, a pair of vertical, sectional guards 44 are placed upon opposite sides of the trimming blades. The upper sections of said guards are relatively fixedly supported at their opposite ends by brackets 45, carried by the channels 39 and 42, respectively, while hingedly connected at 46 to the lower edges of said upper sections are lower sections 47, that normally extend below the upper level of the mold being filled, but are withdrawn from such position and swung upwardly, by means of cables 48 extending over pulleys 49 to any suitable actuating means (not shown), in order to permit shifting of the carriage 29 and the molds positioned thereon.

After the descent of each wock, the surplus mud, indicated in Fig. 12 as being above the plane of the upper edges of the mold, must be removed. For this purpose there is provided a rotating slick (Figs. 1, 2, 5, 6, 9 and 10) that comprises a disc 49, essentially having a flat under surface 50 surrounded by a marginal bevelled portion 51, which aids the slick, yieldingly positioned by springs 52, in initially riding upwardly when necessary upon the mud above the mold, the normal plane of the under surface of the slick being coincident with that of the mold's upper surface.

As a matter of fact, the slick is rotated at such a velocity, combined with the tension of its height-positioning springs, that the surplus mud yields to the slicking action of the disc, and is more or less violently thrown to one or both sides. However, the impact of the wock with the mold is so great, that the mud within the mold is very densely compacted, and occasionally causes the slicking disc to rise slightly as it starts to ride over the mold, before the lateral and centrifugal forces of the disc have cleared it away.

The slicking disc is directly supported by a faceplate 53, which is carried by the lower end of a shaft 54, driven at high speed by a motor within a protective casing 55. This casing is provided with oppositely directed brackets 56, which are positioned between vertical pairs of said springs 52, in turn supported by a frame 57, through the center of which said casing is free to oscillate, as the slick rapidly, though at times with a certain degree of hysteresis, settles into its predetermined normal plane of rotation, if momentarily elevated thereabove.

Said frame in turn is carried by and between the adjacent portions of two parallel angle members 57a, having upwardly extending flanges mounting flanged rollers 58, which ride upon the lower flanges of channels 59, supported by and between the standards 1 upon opposite sides of the machine. Sheet metal canopies 60 shelter said rollers and supporting channel track from falling grit (i. e., such particles of the mud as may fall from the buckets while dumping and from the hopper during the oscillation of its closure plates), and to similarly protect the piston rods 61 by which the slick and its supporting and driving mechanism are moved to and fro by alternating pressures within the pneumatic cylinders 62.

The operation of the several pneumatic mechanisms to release the wock from the hopper, move the slick alternately forwardly and rearwardly, and reciprocate the mold carriage, may be manually controlled by suitable valves, or automatically controlled in whole or in part, if preferred. The pair of trimming blades may be fixedly positioned, as shown in the drawings, or may be carried by oscillatable arms to alternately shift them into and away from their jointly operative positions.

In order to convey an idea of the force with which the wock fills and compacts within the mold, the illustrative wock shown in the drawings has a mass of approximately 225 pounds prior to being trimmed by the blades, so that at the end of a drop of 25 feet it is traveling at a speed of about 40 feet per second (27¼ miles per hour), and accordingly strikes the mold and its supporting surface with a tremendous force, considerably greater and more uniform than can be applied by the usual hand-tamping operation.

Having thus described our invention, what we claim and desire to protect by Letters Patent of the United States is:

1. The method of molding brick, which consists in dropping a wock into a mold and trimming it transversely before it reaches the mold.

2. The method of molding brick, which consists in dropping a wock into a mold and trimming it while falling, to a predetermined cross section with respect to and before it reaches the mold.

3. The method of molding brick, which consists in dropping a wock into a mold and cutting away lateral excess while falling, to a width less than that of the mold.

4. The method of molding brick by dropping a wock into a mold, which consists in forming a wock of greater width and height than that of the mold, and trimming said wock while falling, to a predetermined width with respect to and before it reaches the mold.

5. The method of molding brick by dropping a wock into a mold, which consists in forming a wock of greater horizontal dimensions and height than that of the mold, trimming said wock while falling, to a predetermined cross section with respect to and before it reaches the mold, and then removing excess wock material from above the level of the mold after the wock has filled the mold and come to rest.

6. A brick molding machine, comprising a mold, and means to trim a wock to predetermined horizontal cross section as it falls toward said mold.

7. A brick molding machine, comprising a mold, and a set of knife edges above said mold, operative to trim a falling wock to a size transversely less than that of said mold.

8. A brick molding machine, comprising a mold, and a plurality of adjustable knife edges normally fixed with respect to said mold, operative to trim a falling wock to a size transversely less than that of said mold.

9. A brick molding machine, comprising a hopper having a discharge opening, a closure for said opening, a mold positioned a substantial distance below said opening, and a set of blades between said hopper and said mold, operative to trim the wock, as it falls from said hopper opening upon the removal of said closure, and before it enters said mold.

10. A brick molding machine, comprising a hopper having a discharge opening and downwardly diverging inner walls, a substantially symmetrical sectional closure for sudden control of said opening, a mold positioned a substantial distance below said opening, and a set of blades positioned between said hopper and said mold, operative to trim the wock, as it falls from said hopper opening upon withdrawal of said closure, and before it enters said mold.

11. A brick molding machine, comprising a mold, and a plurality of spaced blades above said mold, the planes of the inner surfaces of said blades adjacent to their upwardly directed edges being substantially vertical.

12. A brick molding machine, comprising a mold, and a plurality of blades, the planes of the inner surfaces of which adjacent to their upwardly directed edges are set so as to offer a minimum of frictional resistance to the fall of a wock between them.

13. A brick molding machine, comprising a mold, and a pair of blades above said mold having substantially parallel upwardly directed edges, the planes of the inner surfaces of said blades adjacent to their edges being set so as to offer a minimum of frictional resistance to the fall of a wock between them.

14. A brick molding machine, comprising a mold, a plurality of knife edges normally fixed with respect to said mold, and operative to trim a falling wock to a size transversely less than that of said mold, a guard to restrain the spread of the excess wock material as it strikes said mold, the lower portion of said guard being retractable to permit said mold to be shifted laterally in order to remove the brick from it.

15. A brick molding machine, comprising a plurality of molds, a reciprocatory table carrying said molds in spaced relation with each other, a plurality of knife edges normally fixed with respect to the operative position of one of said molds when it is receiving a wock, and operative to trim a falling wock to a size transversely less than that of said mold relatively fixed, guards upon the laterally opposite sides of the receiving position of said molds to restrain the splash of excess wock material as it strikes said mold, the lower portion of said guards being independently retractable to permit said table and molds to be shifted laterally, in order to permit the removal of brick from said molds alternately.

16. The method of molding brick, which consists in dropping a wock into a mold and altering its horizontal cross section by trimming before it reaches the mold.

17. The method of molding brick, which consists in dropping a wock into a mold and cutting away lateral excess material while it is falling, to reduce its cross sectional area to less than that of the mold.

18. The method of molding brick, which consists in forming a wock of greater horizontal cross section and height than that of a mold, dropping said wock into the mold, and trimming it while falling to a predetermined cross section with respect to and before it reaches the mold.

19. A brick molding machine, comprising a mold, a plurality of spaced upwardly directed knife edges above and normally fixed with respect to said mold, and operative to trim a falling wock to a smaller cross section than that of the mold, a slicking disc rotatable upon a vertical axis and reciprocatable across said mold beneath said knives, the lower surface of said disc being normally in the plane of the upper surface of said mold.

20. A brick molding machine, comprising a mold, a plurality of spaced upwardly directed knife edges above and normally fixed with respect to said mold, and operative to trim a falling wock to a smaller cross section than that of the mold, a slicking disc rotatably carried upon the lower end of an upwardly extending shaft, said shaft being reciprocatable between said knives as said disc passes across said mold, and yielding means to normally maintain the lower surface of said disc in the plane of the upper surface of said mold.

21. A brick molding machine, comprising a mold, a transversely movable support for said mold, a plurality of spaced upwardly directed knife edges above and normally fixed with respect to said mold, and operative to trim a wock falling between them to a smaller cross section than that of said mold, a slicking disc rotatable upon a vertical axis and reciprocatable across said mold beneath said knives, the lower surface of said disc being normally in the plane of the upper surface of said mold, a relatively fixed guard spaced laterally from one of said knives and having a relatively movable lower portion, retractable at will to permit withdrawal of said mold from its wock-receiving position beneath said knives.

22. A brick molding machine, comprising a pair of molds, a transversely movable support for said molds, a plurality of spaced upwardly directed knife edges above and normally fixed with respect to the wock-receiving position of said molds, and operative to trim a wock falling between them to a smaller cross section than that of the mold in receiving position, a slicking disc rotatable upon a vertical axis and reciprocatable across the receiving position of said mold beneath said knives, the lower surface of said disc being normally in the plane of the upper surface of said mold when in receiving position, a relatively fixed guard spaced laterally from one of said knives and having a relatively movable lower portion, retractable at will to permit withdrawal of a full mold from its wock-receiving position beneath said knives.

23. A brick molding machine, comprising a mold, a transversely movable support for said mold, a plurality of spaced upwardly directed knife edges above and normally fixed with respect to said mold, and operative to trim a wock falling between them to a smaller cross section than that of said mold, a slicking disc rotatably carried upon the lower end of an upwardly extending shaft, said shaft being reciprocatable between said knives as said disc passes across said mold, yielding means to normally maintain the lower surface of said disc in the plane of the upper surface of said mold, relatively fixed guards spaced laterally from and upon the opposite sides of said knives and having relatively movable lower portions, retractable to permit withdrawal of a full mold from and shifting of an empty mold into receiving position beneath said knives.

ELMER G. COWAN.
JOHN M. CODER.